W. E. GRAHAM.
LAWN EDGING MACHINE.
APPLICATION FILED MAY 12, 1909.
954,792.
Patented Apr. 12, 1910.
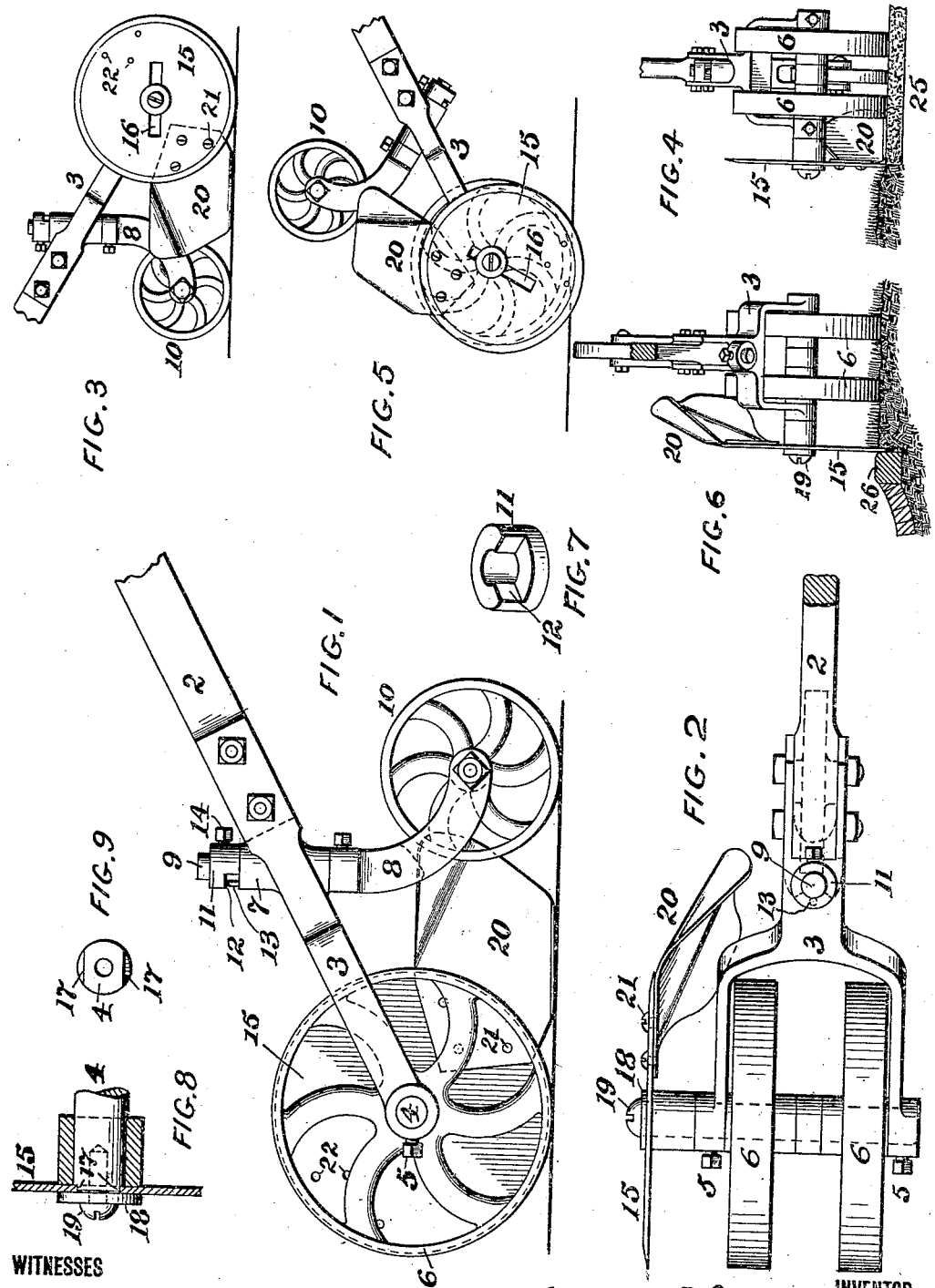
WITNESSES
Daniel Webster, Jr.
E. G. Farley
INVENTOR
Walter E. Graham
BY
ATTORNEY

UNITED STATES PATENT OFFICE.

WALTER E. GRAHAM, OF PHILADELPHIA, PENNSYLVANIA.

LAWN-EDGING MACHINE.

954,792. Specification of Letters Patent. Patented Apr. 12, 1910.

Application filed May 12, 1909. Serial No. 495,535.

*To all whom it may concern:*

Be it known that I, WALTER E. GRAHAM, a citizen of the United States, and a resident of the city and county of Philadelphia, State of Pennsylvania, have invented an Improvement in Lawn-Edging Machines, of which the following is a specification.

My invention has reference to lawn edging machines, and consists of certain improvements which are fully set forth in the following specification and shown in the accompanying drawings which form a part thereof.

The object of my invention is to provide a simple and inexpensive form of machine especially adapted to trimming the edge of lawns where they are intended to terminate adjacent to a roadway or walk.

My invention consists of a carriage having an operating arm, combined with an edging cutter arranged at one side and preferably so shaped as to present a cutting edge with or without capacity for adjustment.

My improvements also embody a structure of the above character when the edging machine is provided with a scraper or plow immediately adjacent to and at the rear of the edging cutter, thereby, when the cutter cuts a line along the edge of the lawn the scraper or plow removes the projecting or surplus grass or sod which has extended above the roadway or walk.

My invention also consists in the construction first above described when the cutter is adapted for adjustment whereby the cutting edge may be caused to cut into the earth to a lower level than the supporting wheels of the carriage, the use of the apparatus under these conditions being especially designed for edging the lawn adjacent to a roadway or gutter in which the lawn is bounded by brick or concrete coping.

My invention also comprehends details of construction which, together with the features above specified, will be better understood by reference to the drawings, in which:

Figure 1 is a side elevation of the edging machine embodying my invention; Fig. 2 is a plan view of the same; Fig. 3 is a side elevation of the machine shown in Fig. 1 on a smaller scale and looking from the opposite side; Fig. 4 is an end view of the machine in operation; Fig. 5 is a side elevation of the machine when inverted and with the edging cutter adjusted for deeply cutting the sod adjacent to a coping; Fig. 6 is the end view of the edging machine shown in Fig. 5 in operation; Fig. 7 is a perspective view of the nut for the axis of the caster wheel; Fig. 8 is a sectional elevation showing the manner of securing the cutter upon the shaft; and Fig. 9 is an end view of the shaft.

3 is a frame forming part of the carriage and has an upwardly extending handle 2 of any suitable construction. The lower part of the frame 3 is formed with two arms in which a fixed shaft 4 is clamped by set screws 5. Journaled upon this shaft and between the arms of the frame 3 are two supporting wheels 6, which may be of any suitable construction, but are preferably separated to give two points of support upon the ground and thereby adapt themselves to irregular surfaces.

To the rear of the wheel 6 the frame 3 is provided with a vertical bearing 7, in which is loosely journaled a vertical shaft 9, carrying at its lower part a caster wheel frame 8 in which the caster wheel 10 is journaled. The caster wheel is free to adjust itself from side to side about the axis of the shaft 9, and the extent of its adjustment may be limited by a collar 11, clamped to the shaft 9 by a set screw 14 and having a segmental notch 12 into which a pin 13 on the bearing 7 projects. It will be seen that when the caster wheel swings to either side about the axis of the shaft 9, the movement will be limited by the ends of the notch 12 striking the pin or obstruction 13.

Secured to the end of the shaft 4 is a circular or disk shaped cutter blade 15, the diameter of which is substantially the same as the diameter of the wheel 6. The plane of this blade 15 is parallel to the plane of revolution of the supporting wheel 6 to the said blade and is located at a considerable distance from the wheels so as to leave a material space between the said blade and wheels.

The blade 15 may be secured to the shaft in any suitable manner, but preferably in the way shown, namely, by providing the end of the shaft 4 with flattened faces 17 and providing the disk cutter 15 with an elongated slot 16 in the line of its diameter so that the edges of the slot snugly fit the flat surfaces 17 on the shaft; and the said blade is then secured in position upon the shaft by means of a clamping screw 19 and a washer 18, the screw being screwed into the end of the shaft 4 and the washer extending over the cutter blade and pressed thereon by the head of the screw, as clearly shown in Fig. 8. By this construction the cutter blade cannot rotate upon the shaft 4, and as the shaft 4 is rigidly secured to the frame 3, it is evident that the said cutter may be adjusted circumferentially to any position desired by loosening the set screws 5 and rotating the shaft 4 to the desired degree. This would only be done when assembling the machine or in case of repairs.

Secured to the cutter 15, and to the rear thereof, is a scraper or plow 20, which is formed of bent sheet metal and having a lower face which rests upon or close to the ground. This scraper 20 is secured to the face of the cutter by means of screws 21 extending through holes 22 in the cutter blade. The adjustment is such that when the machine is in the position shown in Fig. 1 resting upon a flat surface, the scraper or plow 20 is adjusted flat upon the ground and which position may be maintained by tightening the set screws 5. In this construction it is seen that the wheels 6 and 10 with the connecting frames 3, 8 and 9, constitute in effect a carriage, the said carriage having an upwardly and rearwardly extending handle 2. As this carriage is self-supporting it is evident that the scraper or plow 20 will always maintain a definite position with respect to the ground and cannot mutilate the same nor permit the scraper to be injured by accidentally engaging the ground or obstructions to too great a depth.

In the use of the edging machine above described, a reference is made to Fig. 4, in which the device is shown as edging a lawn adjacent to a sidewalk or road. It will be seen that the cutter 15 is trimming the edge of a lawn adjacent to the roadway 25 and that the carriage runs upon the roadway with the scraper traveling along close to the surface of the roadway. In this way the projecting grass is trimmed and the scraper snaps it away pushing it laterally some distance into the roadway or walk, where it may be collected. The effect of this treatment is to give a clearly defined demarcation between the lawn and the road or walk, and at the same time enable the said result to be secured in a speedy, accurate and effective manner.

Should the cutter 15 become worn excessively adjacent to its lower edge, the scraper 20 may be removed, the set screws 5 loosened, and the cutter blade rotated one-half revolution to bring the second set of holes 22 into position for receiving the screws 21, which are again applied to secure the scraper in a new position upon the cutter. This adjustment will bring the upper part of the cutter to the bottom and the set screws may then be tightened and the machine thereby once more placed in operative condition. By this capacity for adjustment it will be seen that the upper and lower portions of the disk cutter 15 become effective for use in trimming the lawn adjacent to a flat roadway or walk.

Where the machine is to be used for edging adjacent to a coping or gutter, as indicated in Fig. 6 where 26 is the coping or edge of gutter, the machine is turned upside down as indicated in Fig. 5 and the cutter 15 is adjusted upon the shaft so that its cutting edge is lowered below the lowest part of the wheel 6, as clearly indicated in Fig. 5 and also in Fig. 6. When the parts are so adjusted the weight of the machine is carried upon the wheels 6 and by pressing down upon the handle the cutter blade may be caused to travel along the edge of the coping 26 and cut down to some distance below the surface of the grass so as to trim the same in a clearly defined manner.

By making the slot 16 to extend each side of the center of the cutter, it is evident that the adjustment of said cutter above described may be had when the scraper 20 is secured to the cutter in either of the two positions hereinbefore referred to. As the carriage in this case is only resting upon the two wheels 6, it is evident that the handle may be adjusted to different inclinations and in this way cause the cutter blade to enter the earth to different depths. The angle shown in Fig. 5 is the normal angle shown in Fig. 1, but with the handle elevated to a slightly steeper angle, the slot 16 in the cutter would assume a vertical position instead of a slight inclination. This difference in possible obliquity is immaterial and is merely incidental to the handling of the tool by the gardener. By giving capacity for reversing the tool for edging adjacent to copings, it is possible to secure the results desired without removing the scraper 20.

It is evident that while the caster wheel 10 is desirable in the case of the use of the scraper 20, it is not essential and may if desired be omitted, the carriage in such case employing only the wheel 6. While I prefer that the cutter shall be circular or in disk form because of the simplicity of the manufacture and sharpening of the same, it is evident that the cutter may be made in various ways so long as it presents the proper cutting edge at its immediate contact with the lawn, and therefore I do not restrict myself to a disk shaped cutter.

I have shown my machine in the form which I have constructed it in commercial practice, and while the details thereof secure the advantages of the invention and are preferred, I do not restrict myself thereto as they may be modified in various ways without departing from the spirit of the invention.

Having now described my invention what I claim as new and desire to secure by Letters Patent, is:

1. In a lawn edging machine, the combination of a revoluble supporting roller, a handle upon which the roller is journaled, a cutter located to one side of and extending downward to the level of the bottom of the roller and normally secured to the handle portion, against movement relatively to the handle and a scraper arranged to the rear of the cutter and on the level of the bottom of the roller.

2. In a lawn edging machine, the combination of a supporting roller, a handle upon which the roller is journaled, a disk shaped cutter located to one side of and extending downward to the level of the bottom of the roller and secured to the handle portion, clamping means for holding the cutter and permitting it to be adjusted upside down relatively to the handle, a scraper arranged to the rear of the cutter and on the level of the bottom of the roller, and means for detachably connecting the scraper to the cutter at either of diametrically opposite sides whereby the cutter may be reversed without changing the operative position of the scraper.

3. In a lawn edging machine, a freely rotatable wheel support, combined with a fixed shaft, a handle device secured to said shaft, a cutter secured upon the end of the shaft to one side of the wheel support and adjustable transversely to the shaft whereby its cutting edge may be adjusted below the lower part of the wheel support.

4. In a lawn edging machine, a carriage comprising wheels, a fixed shaft having parallel guiding edges on its end, and a handle secured to the shaft, combined with a disk-shaped cutter having a slot in the direction of its diameter and fitted upon the straight guiding edges of the shaft for holding the cutter in adjustable position the construction being such that the cutter may be adjusted transversely to the length of the handle to bring its cutting edge below the lower part of the carriage wheels.

5. In a lawn edging machine, a carriage device comprising a frame extending upward into a handle and having a transverse shaft secured at its lower end, wheels journaled upon the shaft, a vertical shaft journaled to the rear of the transverse shaft and having a rear extension, a caster wheel journaled upon the rear extension of the vertical shaft, and a cutter secured to the end of the transverse shaft and extending downward.

6. In a lawn edging machine, a carriage device comprising a frame extending upward into a handle and having a transverse shaft secured at its lower end, wheels journaled upon the shaft, a vertical shaft journaled to the rear of the transverse shaft and having a rear extension, a caster wheel journaled upon the rear extension of the vertical shaft, a cutter secured to the end of the transverse shaft and extending downward, and a rearwardly extending scraper arranged between the cutter and the carriage.

7. In a lawn edging machine, a carriage device comprising a frame extending upward into a handle and having a transverse shaft secured at its lower end, wheels journaled upon the shaft, a vertical shaft journaled to the rear of the transverse shaft and having a rear extension, a caster wheel journaled upon the rear extension of the vertical shaft, a cutter secured to the end of the transverse shaft and extending downward, rearwardly extending scraper arranged between the cutter and the carriage, and means to limit the lateral adjustment of the caster wheel about the axis of the vertical shaft.

8. In a lawn edging machine, a carriage having a transverse shaft and rotatable supporting members therefor, a disk-shaped cutter secured to the end of the transverse shaft and adjustable transversely thereto, and a scraper having a fixed relation with respect to the cutter and arranged to the rear thereof.

9. A lawn edging machine comprising a carriage having supporting wheels and an upwardly extending handle, combined with a normally fixed cutter extending down to the bottom of the carriage and secured to the frame thereof to one side of the supporting wheels.

10. A lawn edging machine comprising a carriage having supporting wheels and an upwardly extending handle, combined with a normally fixed cutter extending down to the bottom of the carriage and secured to the frame thereof to one side of the supporting wheels, and a scraper secured to the cutter and extending rearwardly.

11. In a lawn edging machine, a carriage having two supporting wheels separated at a distance apart and an upwardly extending handle so arranged that the said wheels are pivoted on an axis which is fixedly arranged relatively to the handle, combined with a cutter extending down to the bottom of the carriage and secured thereto at one side of and independent of the supporting wheels, the said cutter being provided with a curved cutting edge and adjustably held so as to be normally immovable upon the carriage but capable of being adjusted to bring its cutting edge below the bottom of the carriage supporting wheels without disturbing the axis of the wheels relatively to the carriage frame and handle.

In testimony of which invention, I hereunto set my hand.

WALTER E. GRAHAM.

Witnesses:
R. M. HUNTER,
R. M. KELLY.